United States Patent [19]
Gabrius

[11] Patent Number: 5,505,419
[45] Date of Patent: Apr. 9, 1996

[54] BAR HANGER FOR A RECESSED LIGHT FIXTURE ASSEMBLY

[75] Inventor: Algimantas J. Gabrius, Carol Stream, Ill.

[73] Assignee: Juno Lighting, Inc., Des Plaines, Ill.

[21] Appl. No.: 219,076

[22] Filed: Mar. 28, 1994

[51] Int. Cl.⁶ ........................................................ F21S 1/06
[52] U.S. Cl. .................. 248/343; 248/547; 248/200.1; 248/298.1; 248/909
[58] Field of Search .................... 248/546, 547, 248/200.1, 217.3, 298, 342, 343, 906, 909, 205.1

[56] References Cited

U.S. PATENT DOCUMENTS

| | | | |
|---|---|---|---|
| 2,003,159 | 5/1935 | Taylor | 248/909 X |
| 4,762,162 | 8/1988 | Chochrek | 248/909 X |
| 4,967,990 | 11/1990 | Rinderer | 248/546 X |
| 4,972,339 | 11/1990 | Gabrius | 248/343 X |
| 4,978,092 | 12/1990 | Nattel | 248/909 X |
| 5,178,503 | 1/1993 | Losada | 248/547 X |
| 5,386,959 | 2/1995 | Laughlin | 248/200.1 X |

Primary Examiner—Ramon O. Ramirez
Assistant Examiner—Derek J. Berger
Attorney, Agent, or Firm—Anthony S. Zummer

[57] ABSTRACT

A bar hanger used in a recessed light fixture assembly to support the assembly on a support member. The bar hanger has an elongated arm which has its length substantially greater than its width. A mounting ear is fixed on one end of the arm. The mounting ear is adapted to be connected to a fastener to secure the ear to a support member. The arm has a score extending across the length of the arm so that the arm may be selectively fractured at the score to shorten the length of the arm.

6 Claims, 5 Drawing Sheets

FIG. I

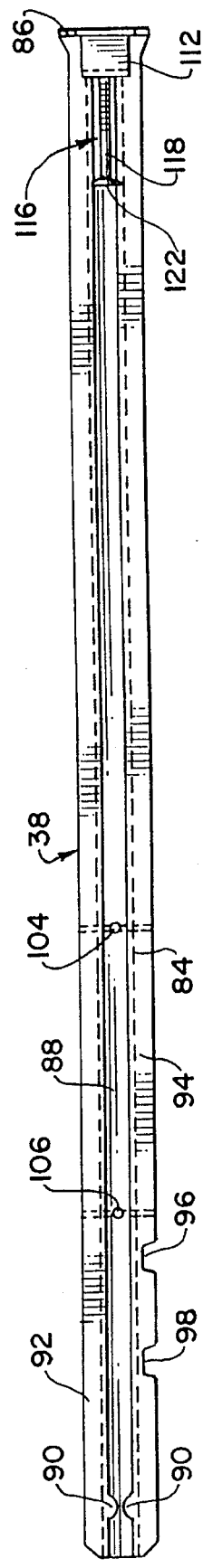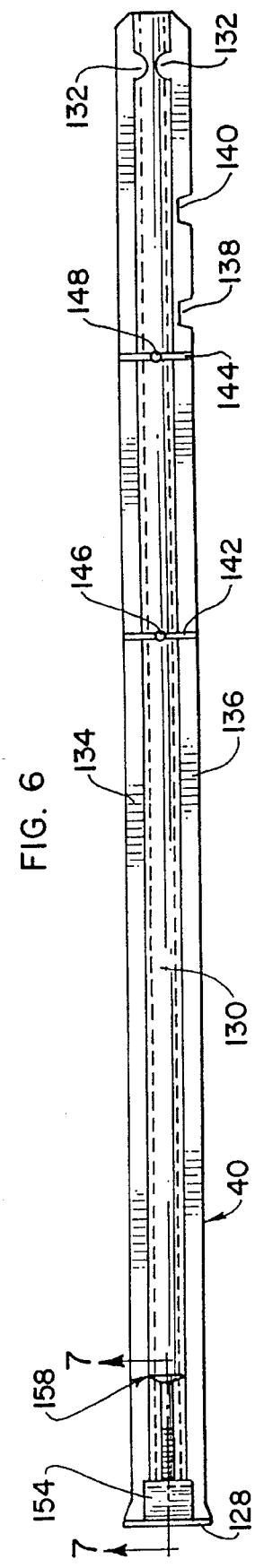

BAR HANGER FOR A RECESSED LIGHT FIXTURE ASSEMBLY

BACKGROUND OF THE INVENTION

The present invention relates to an improved bar hanger used with a recessed light fixture assembly. The utilization of factory made and preassembled recessed light fixture assemblies is well accepted in the lighting industry. One type of recessed lighting fixture which is well accepted is that shown in U.S. Pat. No. 4,972,339, issued Nov. 20, 1990, to Algimantas J. Gabrius, titled, "Recessed Light Fixture Assembly." The Gabrius assembly generally includes a plaster frame with a housing mounted on the plaster frame. A lamp socket is mounted within the housing. A wire junction box is mounted on the plaster frame and is connected to the lamp socket. The plaster frame has bar hangers on a pair of opposite sides of the plaster frame for mounting the assembly between support members. Another type of recessed light fixture is disclosed in U.S. Pat. No. 5,222,800, issued Jun. 29, 1993, to Kingsley Chan et al, titled, "Recessed Lighting Fixture." The Chan et al recessed light fixture does not have a plaster frame, but rather, bar hangers are connected directly to opposite sides of a housing. In either construction, the bar hangers are attached to a pair of support members, such as, rafters or joists. The method of installation of recessed light fixtures is well known and described in detail in the two aforementioned patents to Gabrius and Chan et al.

One of the problems in the utilization of a factory made preassembled recessed light fixture assembly is that the bar hangers may be too long for the distance between support members, such as, rafters or joists. It is necessary for the installer to shorten the bar hangers. Typically, the installer will use a hacksaw to cut through the bar hanger to shorten the bar hanger. In an effort to save time, the cut into the bar hanger may not be deep enough so that when there is an attempt to break the bar hanger by bending, the metal is bent a substantial amount before it breaks. The excessive bending prevents the bar hanger from being readily reconnected into the light fixture assembly. Thus, the bar hanger requires replacement or the entire assembly may be discarded. The time and effort utilized in dealing with a shortening operation of the bar hanger may result in an undue amount of time taken for the installation of a recessed light fixture assembly.

It is desirable to provide a bar hanger for use in a recessed light fixture assembly wherein the bar hanger may be selectively shortened by fracturing the bar hanger at a selected position without interfering with the normal reinstallation of the bar hanger into the remainder of the recessed light fixture assembly.

SUMMARY OF THE INVENTION

The present invention relates to an improved bar hanger for use in a recessed light fixture assembly. The bar hanger supports the assembly on a support member. The bar hanger includes an elongated arm having its length substantially greater than its width. A mounting ear is fixed on one end of the arm. The mounting ear is adapted to be connected to a fastener to secure the ear to a support member. A score is formed in the arm. The score extends across the length of the arm, whereby the arm may be selectively fractured at the score to shorten the length of the arm.

BRIEF DESCRIPTION OF THE DRAWINGS

FIG. 5 is a plan view of a left bar hanger embodying the present invention;

FIG. 6 is a plan view of a right bar hanger embodying the present invention;

DESCRIPTION OF THE PREFERRED EMBODIMENT

Figure 1:
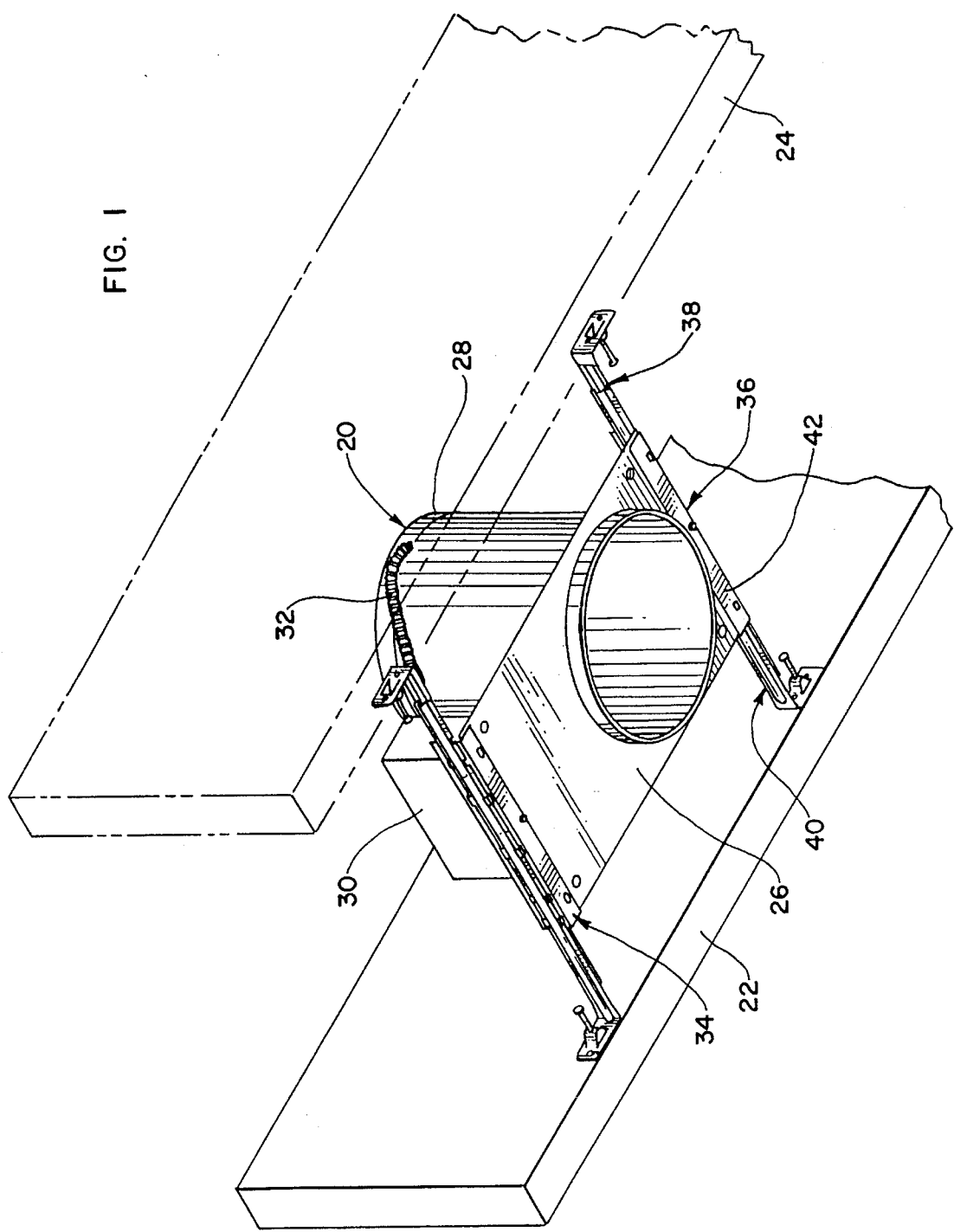
FIG. 1 is a perspective view of a recessed light fixture assembly including bar hangers each of which is a specific embodiment of the present invention.

Referring now to the drawings and especially to FIG. 1, a recessed light fixture assembly generally indicated by numeral 20 is shown mounted between a pair of joists 22 and 24 (joist 24 is shown in phantom view), as is conventional. Light fixture assembly 20 generally includes a conventional plaster frame 26 with a conventional housing 28 mounted on the frame. A conventional lamp socket is mounted in the housing 28 though the lamp socket is not shown herein. A conventional wiring junction box 30 is mounted on the plaster frame and is connected to the lamp socket by a conduit 32. A bar hanger bracket 34 is mounted on one side of plaster frame 26, and a second bar hanger bracket 36 is mounted on the opposite side of plaster frame 26. A left bar hanger 38 is slidably mounted in bar hanger bracket 34, as is right bar hanger 40.

Bar hanger bracket 36 is identical to bar hanger 34 and like numbers are used for the individual parts of the bar hangers. Bar hanger 36 includes a ledge 42 which carries a pair of integrally formed hooks 44 and 46 to secure the bar hanger bracket to plaster frame 26, as is conventional. A conventional screw 48 prevents hooks 44 and 46 from disengaging the plaster frame. A side wall 50 is formed integral with ledge 42.

Figure 3:
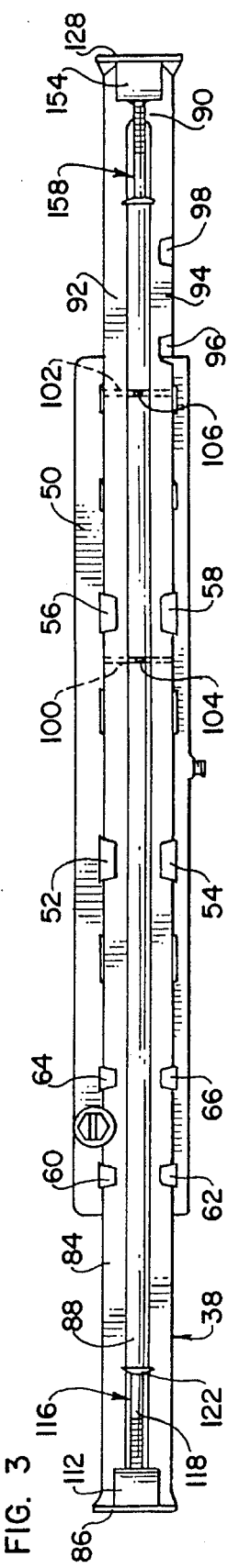
FIG. 3 is a side elevational view of the bar hanger bracket and the bar hangers of FIG. 2.

A plurality of tabs and fingers is formed on one side of the side wall to hold slidably the left bar hanger as may be best seen in FIG. 3. Spaced retaining tabs 52 and 54 are formed integral with the outer surface of side wall 50. Second retaining tabs 56 and 58 are also formed integral with side wall 50, and are aligned with retaining tabs 52 and 54, respectively, to receive slidably the left bar hanger. Retaining fingers 60 and 62 are formed integral with side wall 50 on the same side as retaining tabs 52, 54, 56 and 58. Second retaining fingers 64 and 66 are formed integral with side wall 50. The retaining fingers 60, 62, 64 and 66 are aligned with retaining tabs 52, 54, 56 and 58, respectively, so that the left bar hanger may slide between the retaining tabs and the retaining fingers.

Figure 4:
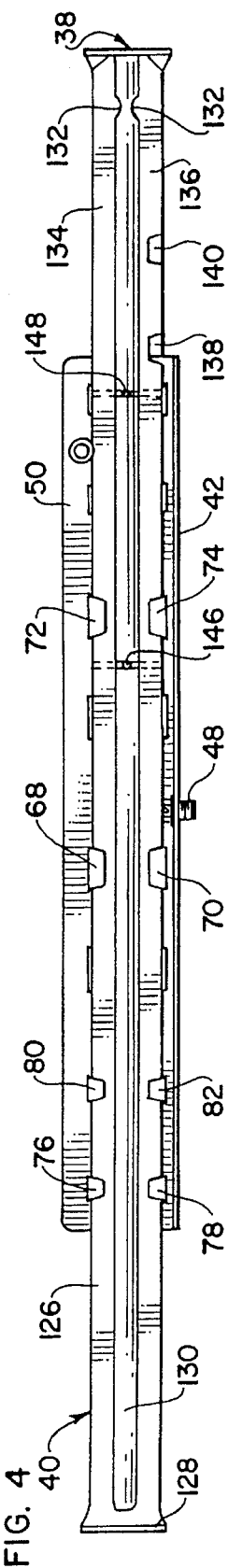
FIG. 4 is a side elevational view of the bar hanger bracket and a pair of bar hangers of FIG. 2.
Figure 8:
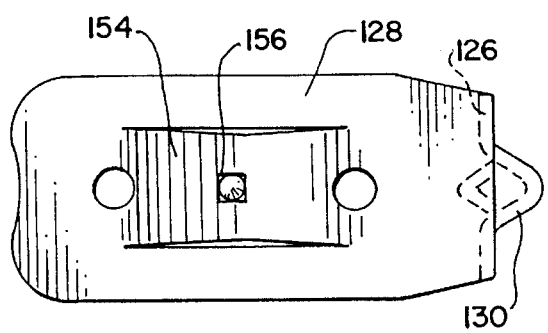
FIG. 8 is an end view of the bar hanger of FIG. 6.

A plurality of interior tabs and fingers is found on the opposite side of the side wall to hold slidably the right bar hanger as is shown in FIG. 4. Side wall 50 has on its opposite or interior side integrally formed interior retaining tabs 68 and 70. Second interior retaining tabs 72 and 74, which are aligned with retaining tabs 68 and 70, are formed integral with side wall 50. Side wall 50 also has integrally formed spaced interior retaining fingers 76 and 78, and second interior retaining fingers 80 and 82, which are aligned with retaining fingers 76 and 78, respectively. The interior retaining fingers 76, 78, 80 and 82 are aligned with interior retaining tabs 68, 70, 72 and 74, respectively, as may be seen in FIG. 4, so that right bar hanger 40 may slide there between but be held to the bar hanger bracket as is conventional.

Figure 2:
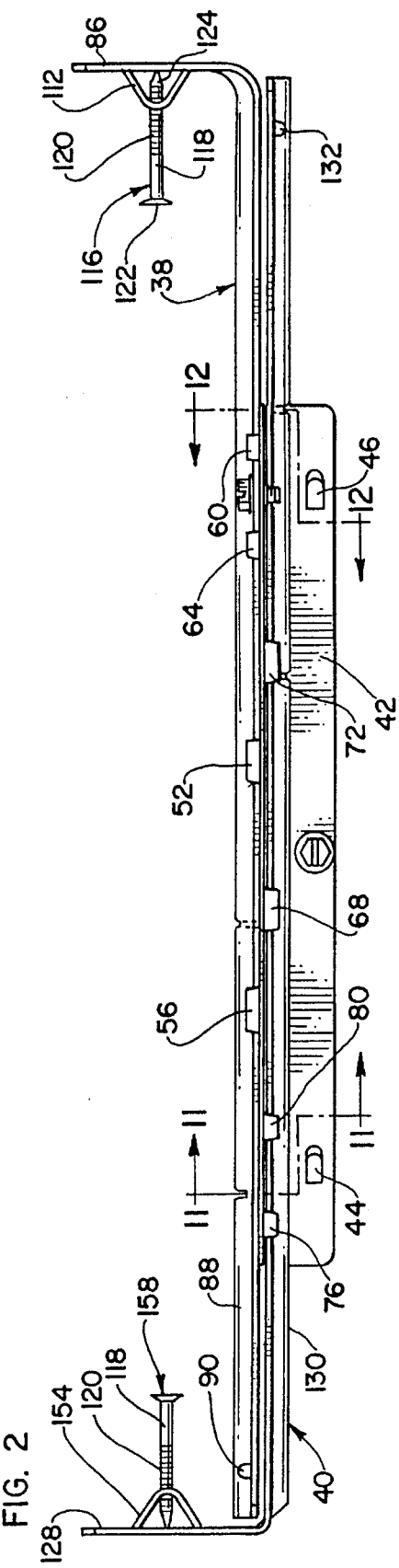
FIG. 2 is a top view of a right and left bar hanger mounted in a bar hanger bracket of the recessed light fixture assembly of FIG. 1.

Left bar hanger 38 includes an elongated arm 84 with a mounting ear 86 formed integral on one end of the arm, as may be seen in FIGS. 2, 3 and 5. Ear 86 is substantially perpendicular to the arm. The elongated arm 84 has a length which is substantially greater than its width. A stiffener rib 88 is formed in substantially the entire length of arm 84 to make the arm rigid. The rib is positioned in the middle of the width of the arm. Rib 88 protrudes outward in the same direction as ear 86. The rib has a pair of indentations 90 adjacent to its free end to form a locking stop for the arm. The arm has an upper edge 92 and a lower edge 94. The lower edge has a pair of assembly notches 96 and 98 which are similar in shape to retaining fingers 62 and 66. Assembly notches 96 and 98 are spaced apart the same distance as retaining fingers 62 and 66, so that the bar hanger may be disengaged from the bar hanger bracket.

Arm 84 has a pair of identical scores 100 and 102 formed on one side so that the scores extend into the stiffening rib. In this specific instance, the thickness of the arm steel material is approximately 0.124 cm., and the depth of the scores is approximately 0.063 cm. Break apertures 104 and 106 are formed in arm 84 in the center of the rib, and thus, midway between edges 92 and 94. Break apertures 104 and 106 extend through the arm to communicate with scores 100 and 102, respectively. The position of the scores 100 and 102 is adjacent to side wall 50. The scores cooperate with respective break apertures to facilitate fracture of the arm. When it is necessary to shorten arm 84, an installer need only remove the bar hanger from the bar hanger bracket and bend the arm at one of the selected scores, so that the arm fractures at the score without distorting the arm. The bar hanger with the shortened arm is then replaced in the bar hanger bracket for use.

Ear 86 has an inner face 108 and an outer face 110. The ear has a bridge 112 formed integrally therein which bridge contains a fastener aperture 114. The fastener aperture has mounted therein a fastener 116, which in this instance is a conventional dry wall nail. The dry wall nail includes a shank 118 with serrations 120. A conventional head 122 is formed on end of the shank and a point 124 is formed on the other end of the shank. Nail 116 is positioned in the fastener aperture 114 in such a manner that point 124 is positioned between bridge 112 and outer face 110, so that the point does not extend beyond the ear and thereby create a hazard when the light fixture assembly is handled.

Figure 7:
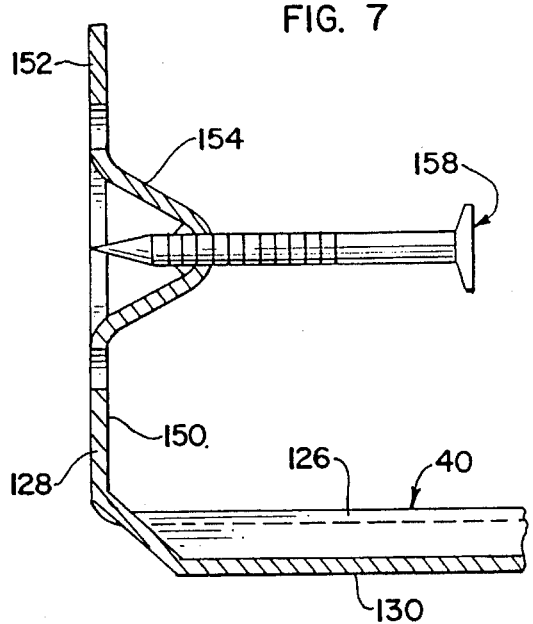
FIG. 7 is an enlarged cross sectional view taken on line 7—7 of FIG. 6.
Figure 9:
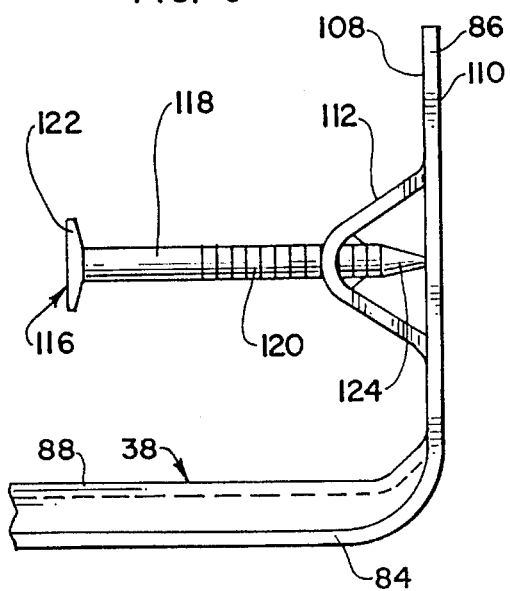
FIG. 9 is an enlarged fragmentary portion of an ear and a portion of the arm of FIG. 5.
Figure 10:
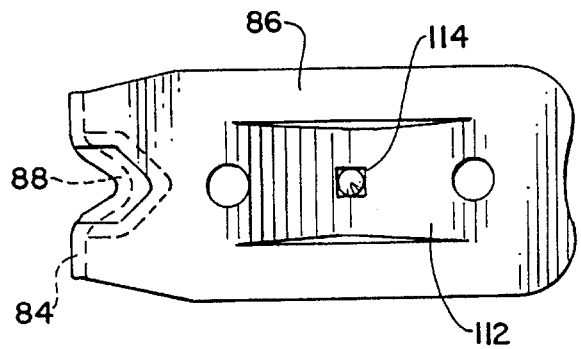
FIG. 10 is an end view of bar hanger of FIG. 5.
Figure 11:
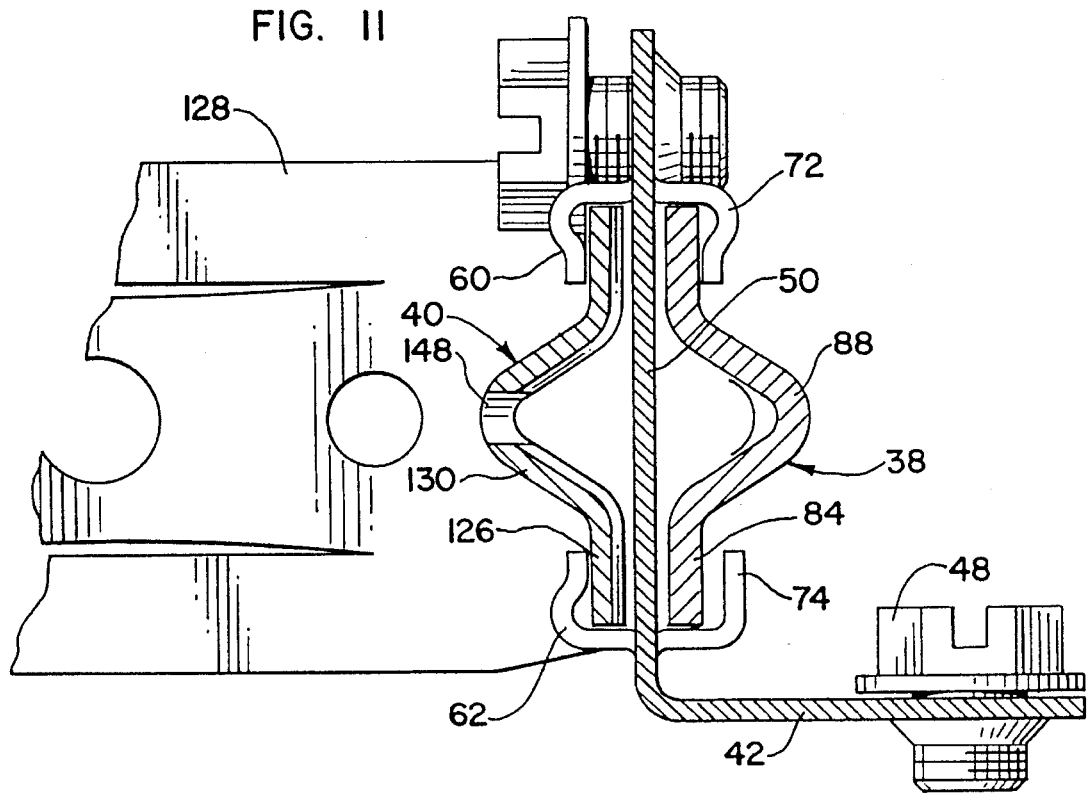
FIG. 11 is an enlarged fragmentary cross sectional view taken on line 11—11 of FIG. 2.
Figure 12:
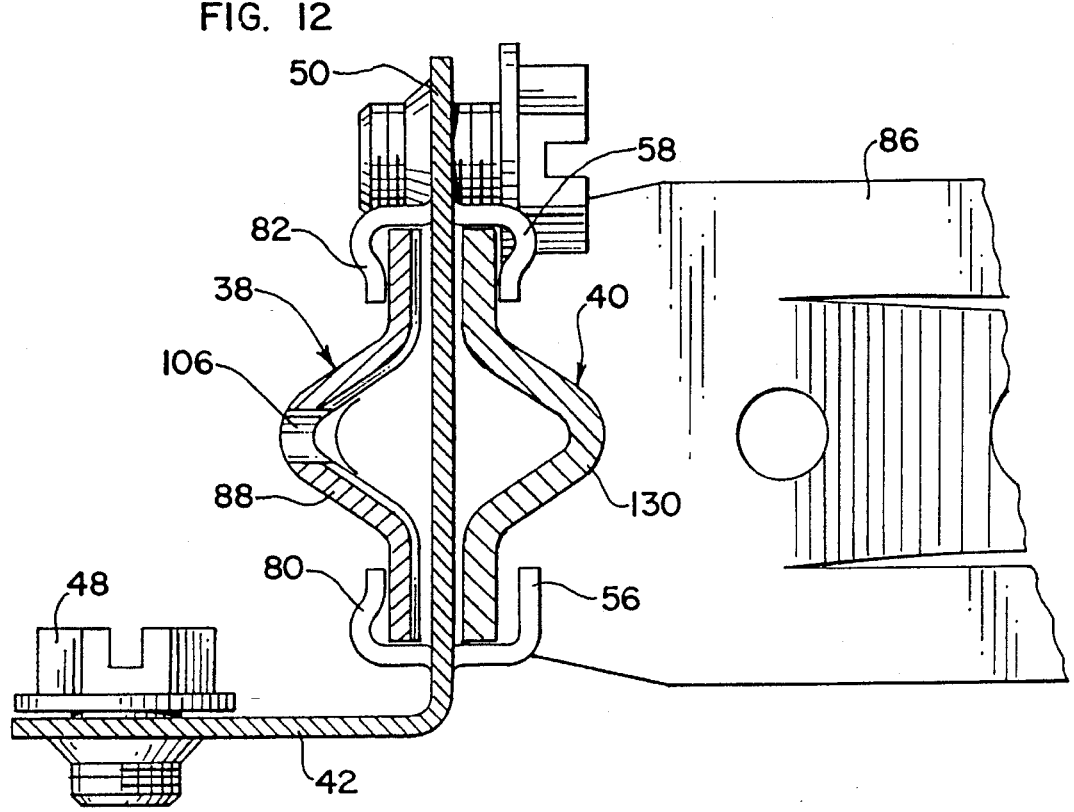
FIG. 12 is an enlarged fragmentary cross sectional view taken on line 12—12 of FIG. 2.

Right bar hanger 40, which is also made of steel in this instance, has a similar construction to left bar hanger 38 described in detail above. The right bar hanger includes an elongated arm 126 with a mounting ear 128 formed integral therewith. Ear 128 is substantially perpendicular to the arm as may be best seen in FIGS. 2 and 7. Elongated arm 126 has a length which is substantially greater than its width as may be seen in FIGS. 4 and 6. A stiffener rib 130 is formed in substantially the entire length of arm 126 to make the arm rigid. Rib 130 in contrast to rib 88 of the left bar hanger protrudes in the opposite direction of respective ear 128. Rib 130 is positioned in the middle of the width of the arm. Rib 130 has a pair of indentations 132 adjacent to its free end to form a locking stop for the arm.

Arm 126 has an upper edge 134 and a lower edge 136. The lower edge has a pair of assembly notches 138 and 140 which are similar in shape to retaining fingers 78 and 82, and are spaced apart the same distance as those retaining fingers so that the bar hanger may be disengaged from the bar hanger bracket. Arm 126 has a pair of scores 142 and 144 formed in one side thereof so that the scores extend into the stiffening rib 130. Scores 142 and 144 are identical to scores 100 and 102 in the left bar hanger 38. Break apertures 146 and 148 are formed in arm 126 in the center of rib 130 and extend through the arm to communicate with scores 142 and 144, respectively. The position of the scores 142 and 144 is adjacent to side wall 50. Scores 142 and 144 cooperate with the respective break apertures 146 and 148 to facilitate a fracture of arm 126 in the same manner that scores 100 and 102 cooperate with the break apertures 104 and 106, respectively, to facilitate fracture of arm 84.

Ear 128 has an inner face 150 and an outer face 152. Ear 128 has an integral bridge 154 identical to bridge 112 of ear 86. Bridge 154 includes a fastener aperture 156 which receives fastener 158 in the same manner that ear 86 receives fastener 116. Fastener 158 is identical in construction to fastener 116 and the same numerals for like parts are used on fastener 158 as are used on fastener 116.

The installation of recessed light fixture assembly 20 is greatly facilitated over the installation of prior art recessed light fixture assemblies in the event that it is found that the distance between supporting members, such as, joists 22 and 24, is too small to accommodate the length of the bar hangers. It is a simple matter for the installer to remove the bar hangers from the bar hanger bracket and break off a desired length of the bar hanger. The fracture of the arm of the bar hanger is accomplished by bending the arm at a selected score and break aperture. The stiffening rib extending along the respective arm of the bar hanger improves the rigidity of the bar hanger. The score with the break aperture allows the arm of the bar hanger to be fractured with a minimum of distortion of the arm so that the bar hanger is capable of being used in its respective bar hanger bracket.

The recessed light fixture assembly with shortened bar hangers is then placed between supporting members, such as, joists 22 and 24. The installer has the advantage of having fasteners mounted in the ears. The installer need only to strike the head of the fastener with an instrument, such as, a hammer to drive the fastener into the supporting member. Inasmuch as the outer surface of the respective ear is substantially perpendicular to the bar hanger arm, the recessed light fixture assembly is properly positioned relative to the joists. The instant recessed light fixture assembly is quickly and easily installed in its selected position with a minimum of effort on the part of the installer and without damage to the light fixture assembly or portions thereof by shortening the bar hangers.

Although a specific embodiment of the herein disclosed invention has been shown and described in detail above, it is readily apparent that those skilled in the art may make various modifications and changes to the disclosed invention without departing from the spirit thereof. It is to be expressly understood that the instant invention is limited only by the claims, and the foregoing specification and the drawings are provided herein in order to comply with the appropriate requirements of disclosure of the invention.

What is claimed is:

1. A bar hanger for use in a recessed light fixture assembly to support the assembly on a support member comprising; an elongated arm having its length substantially greater than its width, a stiffener rib formed integral with said elongated arm, said stiffener rib extending substantially the length of the arm to make the arm substantially rigid along its length, a mounting ear fixed on one end of said arm, said mounting ear being adapted to be connected to a fastener to secure the ear to a support member, a score in said arm extending across the length of the arm, and a break aperture in the stiffener rib extending through the rib and communicating with the score, whereby said arm and stiffener rib may be selectively fractured at the score and the break aperture to shorten the length of the arm.

2. A bar hanger for use in a recessed light fixture assembly to support the assembly on a support member as defined in claim 1, wherein said mounting ear is formed integral with the arm, said mounting ear being substantially perpendicular to the arm to hold the arm substantially perpendicular to a support member when the ear is secured to that support member.

3. A bar hanger for use in a recessed light fixture assembly to support the assembly on a support member as defined in claim 1, including, a bridge formed integral with the mounting ear and extending over a portion of the arm, said mounting ear having an inner face and an outer face, said outer face being adapted to be positioned adjacent to the support member, and a fastener mounted in the bridge, said fastener having a point positioned between the bridge and outer face of the ear.

4. A bar hanger for use in a recessed light fixture assembly to support the assembly on a support member as defined in claim 1, wherein said stiffener rib is positioned substantially midway between opposite sides of the width of the arm, and said break aperture extending through the center of the stiffener rib to facilitate a selective fracture of the arm and the stiffener rib at the score.

5. A bar hanger for use in a recessed light fixture assembly to support the assembly on a support member as defined in claim 1, wherein said break aperture is positioned midway between opposite sides of the width of the arm to facilitate a selective fracture of the arm and the stiffener rib at the score.

6. A bar hanger for use in a recessed light fixture assembly to support the assembly on a support member as defined in claim 1, wherein said mounting ear is formed integral with the arm, said mounting ear being substantially perpendicular to the length of the arm to hold the arm substantially perpendicular to a support member when the ear is secured to that support member, said mounting ear having an inner face and an outer face, said outer face being adapted to be positioned adjacent to the support member, a bridge formed integral with the mounting ear and extending over a portion of the arm, a fastener mounted in the bridge, said fastener having a point extending in a direction opposite to the direction of extension of the length of the arm, said point being positioned between the bridge and the outer face of the ear, and said break aperture positioned in the center of the stiffener rib communicating with the score to facilitate a selective fracture of the arm at the score.

\* \* \* \* \*

(12) EX PARTE REEXAMINATION CERTIFICATE (10131st)
United States Patent
Gabrius

(10) Number: US 5,505,419 C1
(45) Certificate Issued: Apr. 25, 2014

(54) BAR HANGER FOR RECESSED LIGHT FIXTURE ASSEMBLY

(75) Inventor: Algimantas J. Gabrius, Carol Stream, IL (US)

(73) Assignee: Juno Manufacturing, Inc., Des Plaines, IL (US)

Reexamination Request:
No. 90/012,825, Apr. 2, 2013

Reexamination Certificate for:
Patent No.: 5,505,419
Issued: Apr. 9, 1996
Appl. No.: 08/219,076
Filed: Mar. 28, 1994

(51) Int. Cl.
*F21S 8/04* (2006.01)

(52) U.S. Cl.
USPC .............. 248/343; 248/200.1; 248/298.1; 248/547; 248/909

(58) Field of Classification Search
USPC ............................................. 248/343
See application file for complete search history.

(56) References Cited

To view the complete listing of prior art documents cited during the proceeding for Reexamination Control Number 90/012,825, please refer to the USPTO's public Patent Application Information Retrieval (PAIR) system under the Display References tab.

*Primary Examiner* — Matthew C. Graham

(57) ABSTRACT

A bar hanger used in a recessed light fixture assembly to support the assembly on a support member. The bar hanger has an elongated arm which has its length substantially greater than its width. A mounting ear is fixed on one end of the arm. The mounting ear is adapted to be connected to a fastener to secure the ear to a support member. The arm has a score extending across the length of the arm so that the arm may be selectively fractured at the score to shorten the length of the arm.

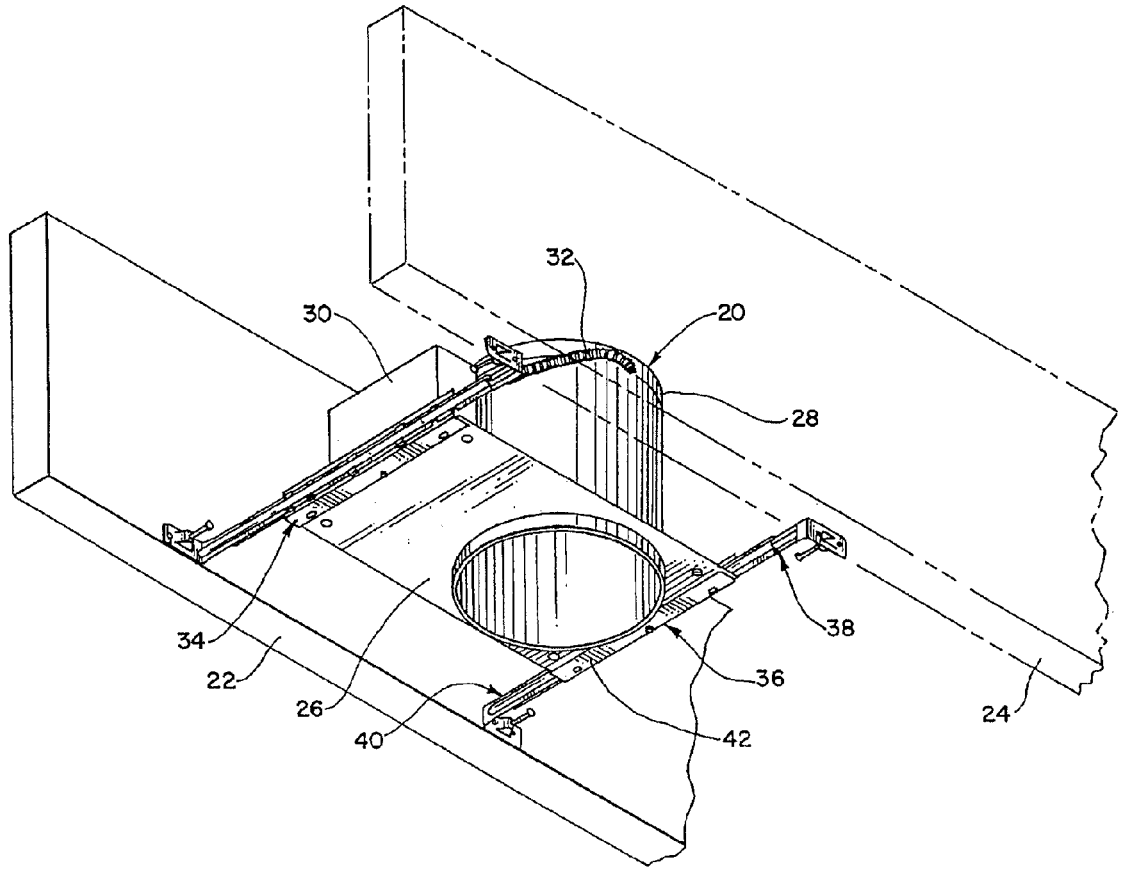

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

\* \* \* \* \*